(12) United States Patent
Evans

(10) Patent No.: US 7,873,909 B2
(45) Date of Patent: Jan. 18, 2011

(54) MANIPULATION AND MERGING OF GRAPHIC IMAGES

(75) Inventor: Barry Grayston Evans, San Diego, CA (US)

(73) Assignee: Photoinaphoto.com, Inc., La Jolla, CA (US)

( * ) Notice: Subject to any disclaimer, the term of this patent is extended or adjusted under 35 U.S.C. 154(b) by 265 days.

(21) Appl. No.: 11/184,189

(22) Filed: Jul. 18, 2005

(65) Prior Publication Data

US 2006/0033754 A1    Feb. 16, 2006

Related U.S. Application Data

(60) Provisional application No. 60/600,177, filed on Aug. 10, 2004.

(51) Int. Cl.
*G06F 3/048* (2006.01)

(52) U.S. Cl. ............... 715/764; 715/273; 715/274; 345/619

(58) Field of Classification Search ............ 345/619; 715/517, 764, 273, 274, 647
See application file for complete search history.

(56) References Cited

U.S. PATENT DOCUMENTS 6,366,316 B1 * 4/2002 Parulski et al. .......... 348/239

2002/0120543 A1 * 8/2002 Brittingham et al. .......... 705/36
2002/0140736 A1 * 10/2002 Chen .......................... 345/777
2004/0205641 A1 * 10/2004 Shimizu ...................... 715/527
2005/0251754 A1 * 11/2005 Padgett et al. ............... 715/779
2009/0019039 A1 * 1/2009 Brindley et al. ................ 707/5

OTHER PUBLICATIONS

Adobe Creative Team, Adobe Photoshop 7.0 Classroom in a Book, Jun. 6, 2005, Published by Adobe Press, pp. 84,89-92,112, 115-116,123-124, 145, 147-148,165-168,185,350-351,565.*
Adobe Creative Team, Adobe Photoshop 7.0 Classroom in a Book, Jun. 6, 2005, Published by Adobe Press, p. 63, found from http://proquest.safaribooksonline.com/0-321-11562-7.*

* cited by examiner

*Primary Examiner*—Sara England
(74) *Attorney, Agent, or Firm*—Merchant & Gould

(57) ABSTRACT

Multiple user interfaces are presented to allow a user to easily and quickly manipulate and merge graphical images. A first user interface allows the user to select amongst available graphical images one or more images to edit and merge. A second user interface allows the user to edit at least one of the selected images using a variety of editing features. Another user interface is provided to facilitate the merging of the selected images. Still another user interface is provided for editing the composite image created from the merging process. Finally, another user interface is provided to allow the user to output the image to file in an e-mail, to a printer, to memory, or the like. Providing multiple user interfaces allows for directed user interaction that increases the simplicity of creating composite graphical images.

20 Claims, 9 Drawing Sheets

MANIPULATION AND MERGING OF GRAPHIC IMAGES

CROSS REFERENCE TO RELATED APPLICATION(S)

This application claims the benefit of U.S. Provisional Application Ser. No. 60/600,177, filed Aug. 10, 2004, the benefit of the earlier filing date of which is hereby claimed under 35 U.S.C. §119 (e).

COMPUTER PROGRAM LISTING APPENDIX

A computer program listing appendix containing the source code of a computer program that may be used with the present invention is incorporated herein by reference as one (1) original compact disk, and an identical copy thereof, containing a total of forty-two (42) files as follows:

| Filename | Date of Creation | File Size (bytes) |
| --- | --- | --- |
| BalloonText.txt | Oct. 4, 2005 | 8,941 |
| BalloonTextInterface.txt | Oct. 4, 2005 | 211 |
| BalloonTextManager.txt | Oct. 4, 2005 | 19,930 |
| BGCanvas.txt | Oct. 4, 2005 | 12,622 |
| BlueScreenColor.txt | Oct. 4, 2005 | 4,506 |
| BSECanvas.txt | Oct. 4, 2005 | 1,213 |
| email.txt | Oct. 4, 2005 | 9,084 |
| EmailDialog.txt | Oct. 4, 2005 | 6,523 |
| FGCanvas.txt | Oct. 4, 2005 | 19,205 |
| HandleRect.txt | Oct. 4, 2005 | 978 |
| ImageCanvas.txt | Oct. 4, 2005 | 16,346 |
| ImagePreview.txt | Oct. 4, 2005 | 6,134 |
| opGui.txt | Oct. 4, 2005 | 1,574 |
| PolyShape.txt | Oct. 4, 2005 | 3,828 |
| QCAboutBox.txt | Oct. 4, 2005 | 1,350 |
| qcBorder.txt | Oct. 4, 2005 | 12,521 |
| qcBrightnessContrast.txt | Oct. 4, 2005 | 3,913 |
| qcDiffusion.txt | Oct. 4, 2005 | 736 |
| qcEdit.txt | Oct. 4, 2005 | 22,717 |
| qcEmboss.txt | Oct. 4, 2005 | 4,400 |
| qcEqualize.txt | Oct. 4, 2005 | 3,590 |
| QCFileChooser.txt | Oct. 4, 2005 | 20,673 |
| qcFisheye.txt | Oct. 4, 2005 | 3,002 |
| qcFlip.txt | Oct. 4, 2005 | 2,809 |
| qcGray.txt | Oct. 4, 2005 | 810 |
| qcJSlider.txt | Oct. 4, 2005 | 1,273 |
| QCLicense.txt | Oct. 4, 2005 | 6,936 |
| qcMelt.txt | Oct. 4, 2005 | 1,041 |
| qcOp.txt | Oct. 4, 2005 | 1,342 |
| qcPBN.txt | Oct. 4, 2005 | 3,640 |
| qcPixelate.txt | Oct. 4, 2005 | 4,075 |
| qcRaise.txt | Oct. 4, 2005 | 5,269 |
| QCResultCallback.txt | Oct. 4, 2005 | 200 |
| qcSharpen.txt | Oct. 4, 2005 | 5,436 |
| qcSird.txt | Oct. 4, 2005 | 8,454 |
| qcSolarize.txt | Oct. 4, 2005 | 715 |
| QCSplash.txt | Oct. 4, 2005 | 1,068 |
| qcStretchOp.txt | Oct. 4, 2005 | 16,595 |
| qcTimeOut.txt | Oct. 4, 2005 | 3,009 |
| qcTwirl.txt | Oct. 4, 2005 | 2,968 |
| qcVintage.txt | Oct. 4, 2005 | 836 |
| QuickComp.txt | Oct. 4, 2005 | 94,070 |

The files include the source code files in compliance with ASCII format. The files are provided on one (1) original compact disk, and an identical copy thereof, that is IBM-PC and MS-Windows compatible.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

Market penetration of digital cameras has created a demand for additional software tools so that consumers can optimize the potential of their digital investment. Digital image manipulation software such as Adobe PhotoShop® provides the ability to alter and transform digital pictures in a variety of ways. For instance, imaging applications have the ability to transpose one image over another in sequential layers. Additionally, these digital image manipulation programs provide a means to artistically transform sections of an image to create special visual effects such as, adding simulated shadow and reflections, color tone and hue alterations, scale and rotation translations, and so forth. The complexity of these types of products limits their use to professional users and limits their applicability to the average consumer.

SUMMARY

Aspects of the present invention are related to enabling the simple creation of composite or merged images (the combination of two or more digital images into a single image) by presenting multiple user interfaces so that manipulation of the images is more intuitive. The user is walked through the multiple interfaces to create a composite image that has been manipulated and edited according to a user's preference.

In accordance with one aspect of the present invention, a computer-implemented method is provided for manipulating graphic images that provides a first user interface that is configured to load a foreground image and a background image into memory in response to a selection. A second user interface is provided that is configured to edit the foreground image in response to an input. A third user interface is provided that is configured to merge the foreground image with the background image. A fourth user interface is provided that is configured to edit the merged image in response to user input. Additionally, a fifth user interface is provided that is configured to save the merged image to memory in response to user input.

In accordance with another aspect of the present invention, a computer-readable medium has instructions for merging a foreground image with a background image. The instructions include loading the foreground image and the background image into memory in response to a user selection from a list of images. The foreground image and background images selected are dynamically illustrated to a user in accordance with a first user interface. Additional instructions include editing the foreground image in response to user input. The edits to the foreground image are dynamically illustrated to the user in accordance with a second user interface. Additionally, the instructions include merging the foreground image with the background image. The merge of the foreground image and the background image is dynamically illustrated to the user in accordance with a third user interface. The merged image is also edited in response to user input. The edits to the merged image are dynamically illustrated to the user in accordance with a fourth user interface. Other instructions are included for saving the merged image to memory in response to user input, wherein the merged image is saved according to a file type selectable by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Manipulation and Merging of Graphical Images

Aspects of the present invention provide a user with the ability to simply and quickly edit a foreground image and merge that foreground image with a background image of the user's choice. In placing the foreground image into a new background image a new composite image is created with the desired proportions and properties as selected by the user.

Figure 1:
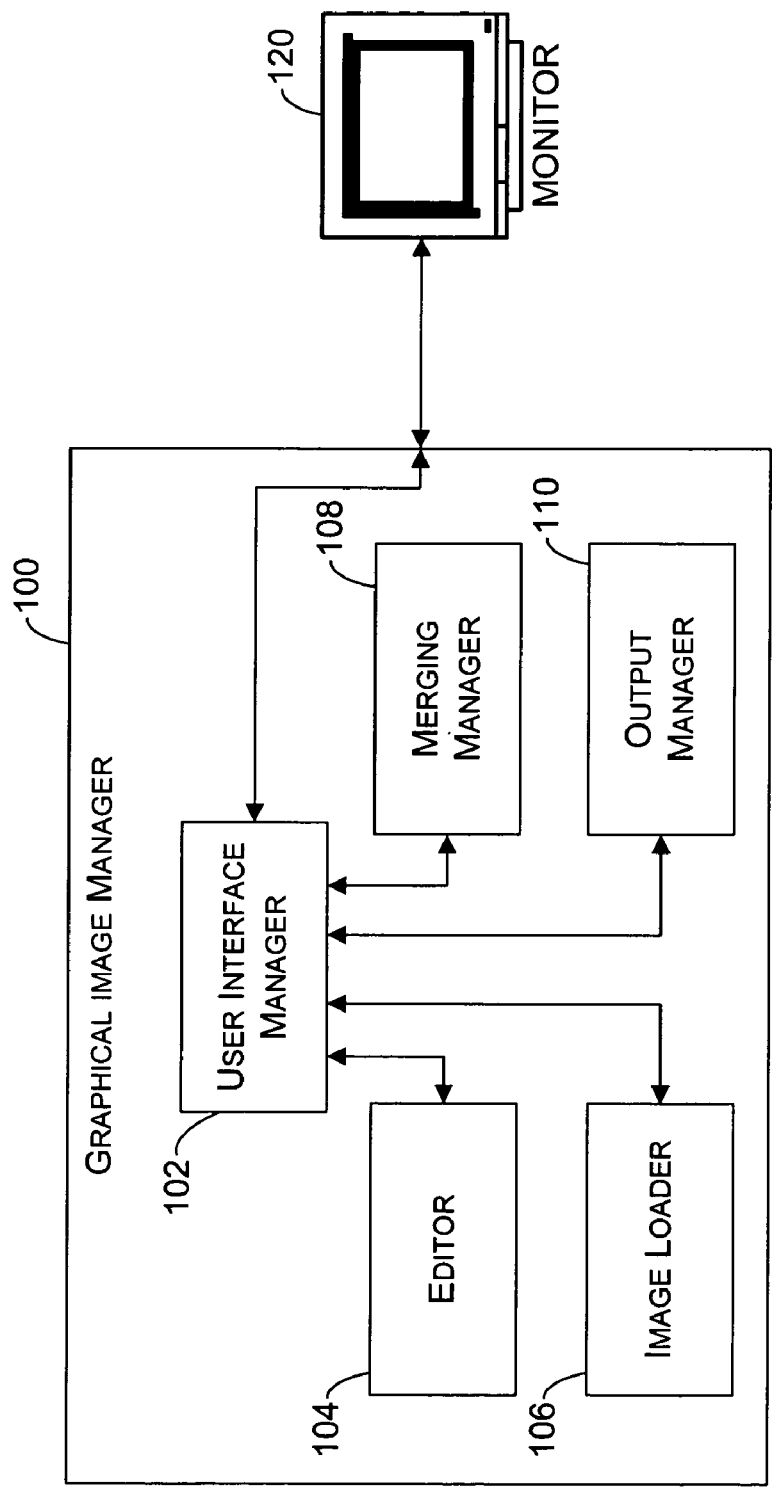
FIG. 1 is a block diagram of an exemplary system for manipulating graphical images.

FIG. 1 is a block diagram of an exemplary system for manipulating graphical images in accordance with the present invention. The exemplary system includes a graphical image manager 100 that is configured to output different user interfaces to display 120 for editing and merging various selected graphical images. In the current embodiment, graphical image manager 100 includes user interface manager 102, editor 104, image loader 106, merging manager 108, and output manager 110.

User interface manager 102 communicates with software modules, such as the editor 104, image loader 106, merging manager 108, and output manager 110, to provide a user interface for output to a user on display 120. In one embodiment, user interface manager provides a user interface to display 120 for each of the software modules included in graphical image manager 100.

In accordance with one implementation of the present invention, a first user interface is presented to the user corresponding to image loader 106. Image loader 106 provides the underlying functionality for loading graphical images for editing and merging. Image loader 106 allows the user to select amongst available images in lists, on CDs, or in files for editing and merging. The functionality corresponding to loading graphical images for editing and merging is described in greater detail below with regard to the exemplary user interface shown in FIG. 2.

A second user interface that is presented to the user corresponds to editor 104. Editor 104 allows the user to edit the images prior to any merge operations. In one example, the editor 104 allows a user to select portions of an image designated as a foreground image and delete the remainder of the image. The selected portion of the image is then left for merging into another image designated as a background image. Editing of graphical images prior to a merge operation is described in greater detail in the discussion below with regard to the exemplary user interfaces shown in FIGS. 3-6. In another example, editor 104 also provides for editing a composite image that results from merging a foreground image with a background image. Editing a composite image is described in greater detail below with regard to the exemplary user interface shown in FIG. 8.

An additional user interface is provided that corresponds to merging manager 108. Merging manager 108 provides the functionality for merging the foreground image and the background image. The merging functionality allows a user to drag and drop the foreground image onto the background image and resizing the foreground image as necessary. The merging functionality of the present invention is described in greater detail in the discussion below with regard to the user interface shown in FIG. 7.

Another user interface is provided that corresponds to output manager 110. Output manager 110 allows the composite image to be output to memory, a printer, or in an e-mail message once the merging and editing of the graphical images is complete. A discussion of the output options is provided below in relation to the user interface shown in FIG. 9.

The discussion of the editing, merging, and output features of the present invention are described in the context of the user interfaces through which a user may take advantage of these features. In one embodiment, the user interfaces provided are considered to provide the editing, merging, and output features. In another embodiment, it is the software modules that are considered to provide the editing, merging, and output features while the user interfaces provides access to this functionality for the user.

Figure 2:
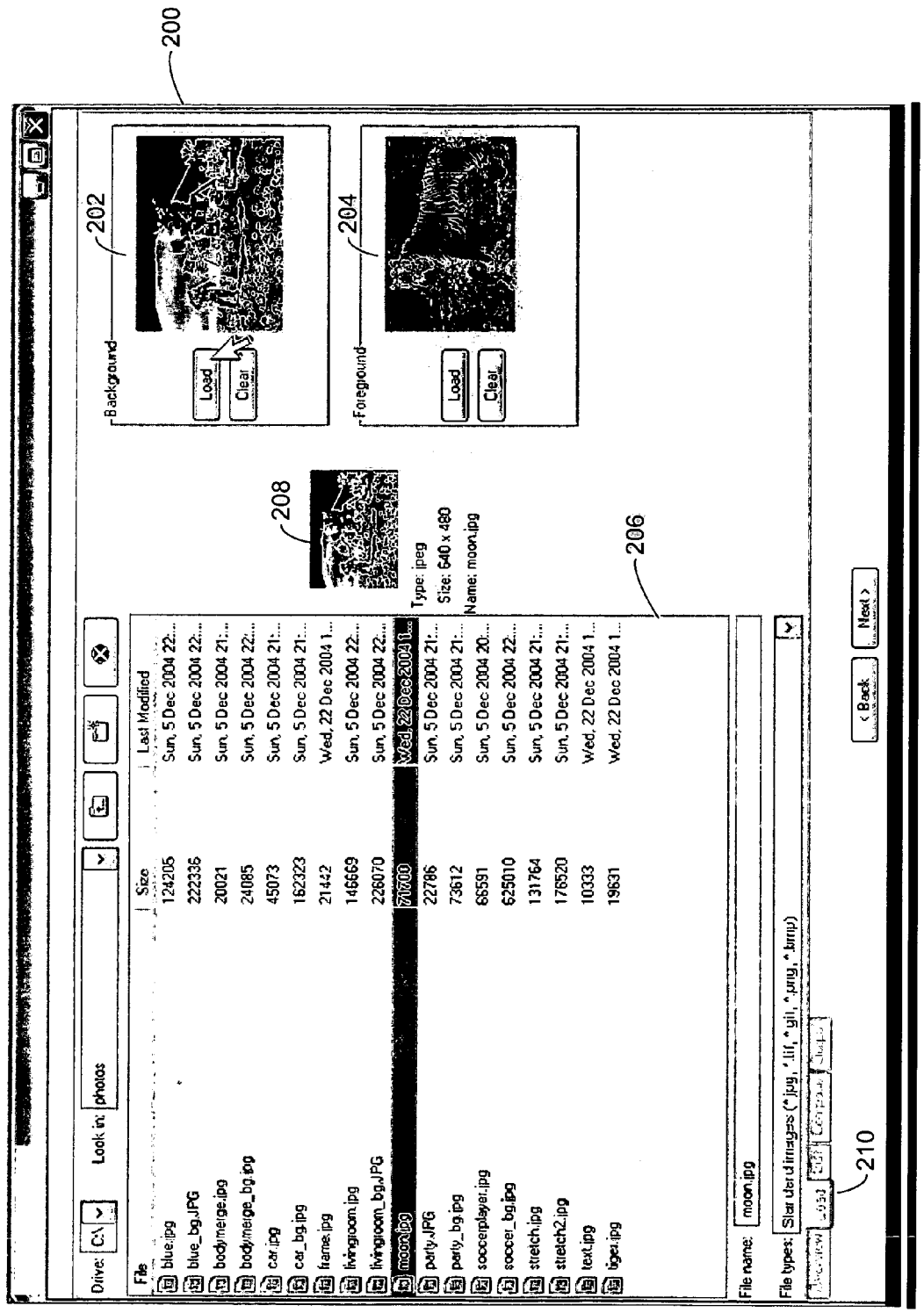
FIG. 2 is a screenshot illustrating an exemplary user interface for loading graphical images for manipulation.

FIG. 2 is a screenshot illustrating an exemplary user interface for loading graphical images for manipulation in accordance with one aspect of the present invention. User interface 200 includes foreground field 202, a background field 204, listing field 206, and preview field 208.

In operation, user interface 208 allows the user to browse the drives and files of their computer or network and select amongst the available graphical images. The available graphical images are shown in listing field 206. The user is able to select a graphical image file from the list or alternately type in the name of a graphical image file to select from those available. The image files that may be selected may be in one of a variety of formats such as .jpg, .bmp, .gif, and the like. The present invention is not limited to the type or format of image files used. When a particular image file is highlighted in listing field 206, the image of the file is illustrated in preview field 208. Preview field 208 allows a user to preview an image before selecting the image to be loaded as the foreground image or background image.

After previewing the image the user may select to load the image as the foreground image or the background image. To load the image shown in preview field 208 as the background image, the user selects the load option in background field 202. To load the image shown in preview field as the foreground image, the user selects the load option in the foreground field 204. When an image has been loaded as either the foreground or background image, the image is displayed in foreground field 204 and background field 202 respectively. Displaying the images as the selections of image files are made allows the user to cycle through images easily so that a user is not required to perform multiple back-and-forth operations to get images loaded. The user is able to change or clear their selections of the foreground and background images as desired. Once a final determination is made for the foreground and background images, processing can continue on to other steps provided in accordance with additional user interfaces provided by the present invention. In accordance with one aspect of the present invention, a user may transition to other user interfaces and return to user interface 200 at any time by selecting user interface tab 210. Other user interface tabs are also provided for the other functions provided by the present invention, such as editing the images, and merging or composing the image. With images loaded, the user is able to transition to the user interfaces that correspond to these additional functions at any time.

Figure 3:
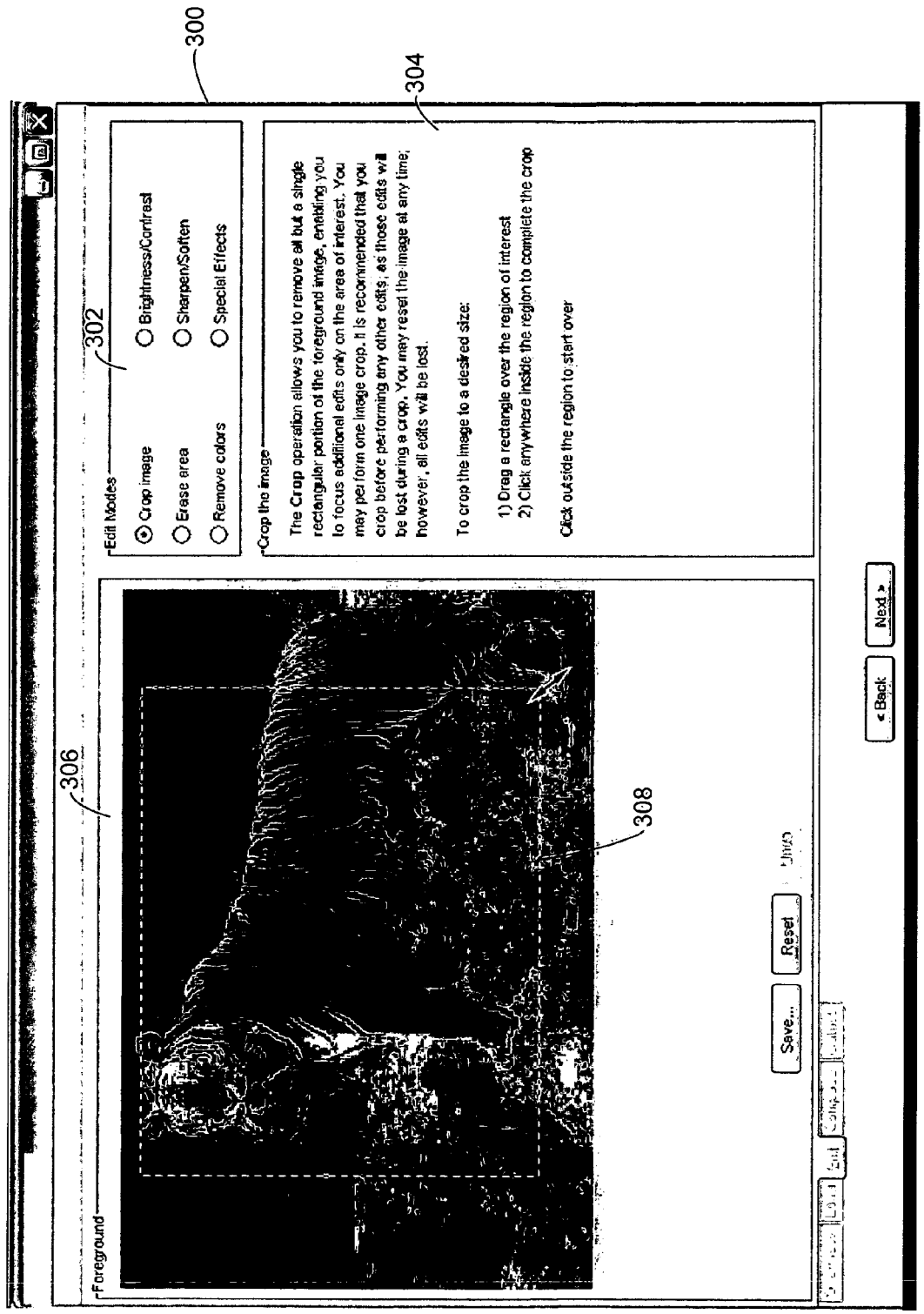
FIG. 3 is a screenshot illustrating an exemplary user interface for editing a foreground image.

FIG. 3 is a screenshot illustrating an exemplary user interface for editing a foreground image in accordance with the present invention. User interface 300 includes edit mode field 302, selected edit field 304, and image field 306. User interface 300 corresponds to a selection of the "crop image" edit mode in edit mode field 302. For each edit mode selected in edit mode field 302, selected edit field 304 changes to correspond to the edit mode selected. For example, since the "crop image" edit mode is selected, selected edit field 304 has been updated to provide instructions for cropping the foreground image shown in image field 306. As the instructions indicate, an image may be cropped by simply dragging a box (e.g., 308) around the area to crop and clicking anywhere inside the cropped region. Cropping an image allows a user to select a region of an image to merge with a background rather than the whole image. Image merging often involves taking a subject from a previous image and inserting that subject into another background image. Accordingly, a user often desires to discard the current background of the image the subject is in. Cropping an image allows for a substantial portion of the previous background to be removed from the foreground image. Once an image is cropped as desired by the user, the user may move on to other edit modes provided in edit mode field 302 or to other functions provided according to the other user interfaces of the present invention.

Figure 4:
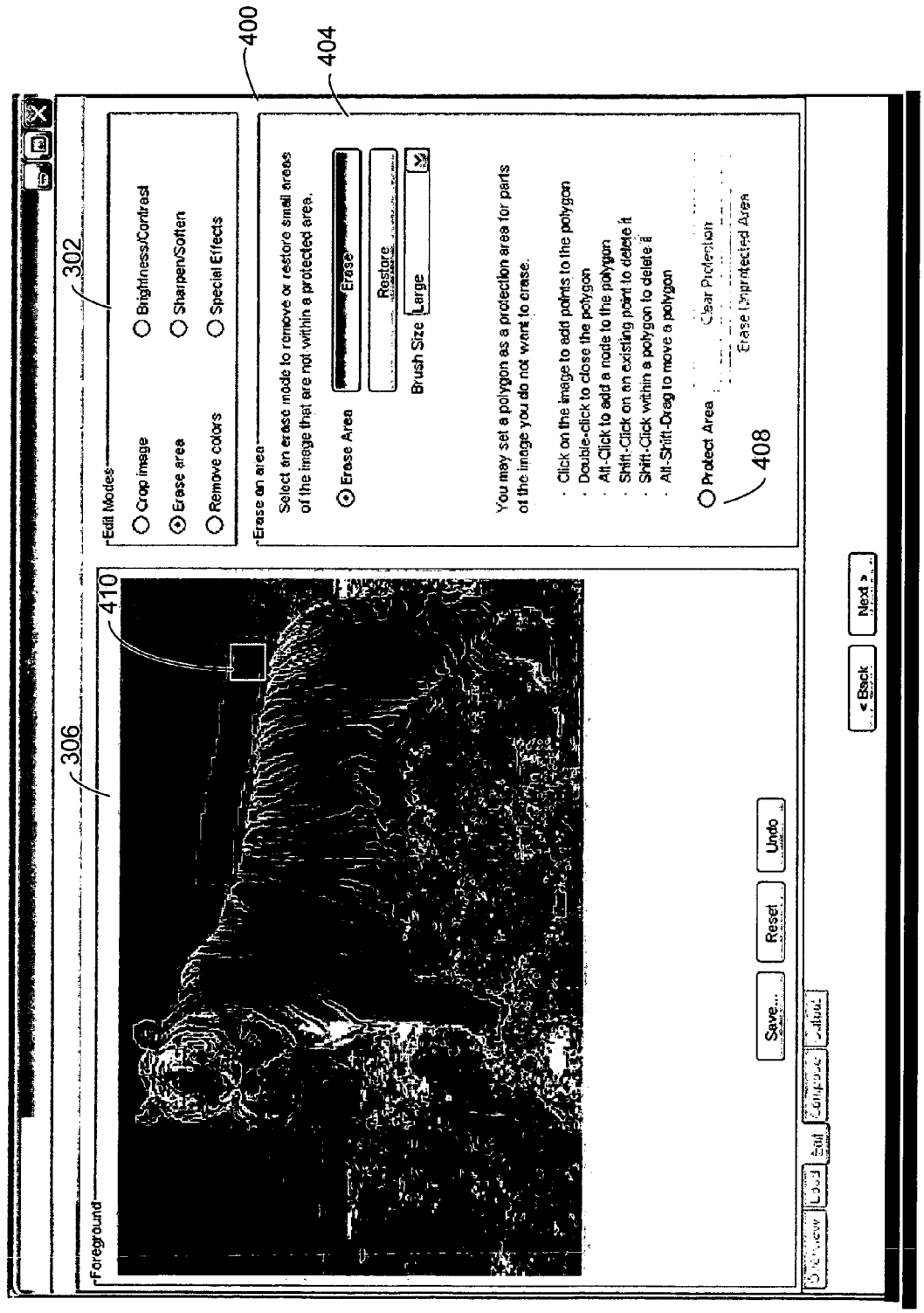
FIG. 4 is another screenshot illustrating an exemplary user interface for editing a foreground image.

FIG. 4 is another screenshot illustrating an exemplary user interface for editing a foreground image in accordance with the present invention. User interface 400 illustrates another edit mode and includes edit mode field 302, selected edit field 404, and image field 306. In edit mode field 302 an "erase area" mode is selected. Since the "erase area" edit mode is selected, selected edit field 404 has been updated to provide instructions and options for erasing portions of the foreground image shown in image field 306. As the instructions indicate, a brush (e.g., 410) may be used to manually erase portions of the image. Also included in selected edit field 404 is protect area selection 408 which may be used to protect an area of the image from alteration (e.g., the portion is not erased). Protect area selection 408 is described in greater detail in the discussion of FIG. 5 below. Once any portion of the image is erased as desired by the user, the user may move on to other edit modes provided in edit mode field 302 or to other functions provided according to the other user interfaces of the present invention.

Figure 5:
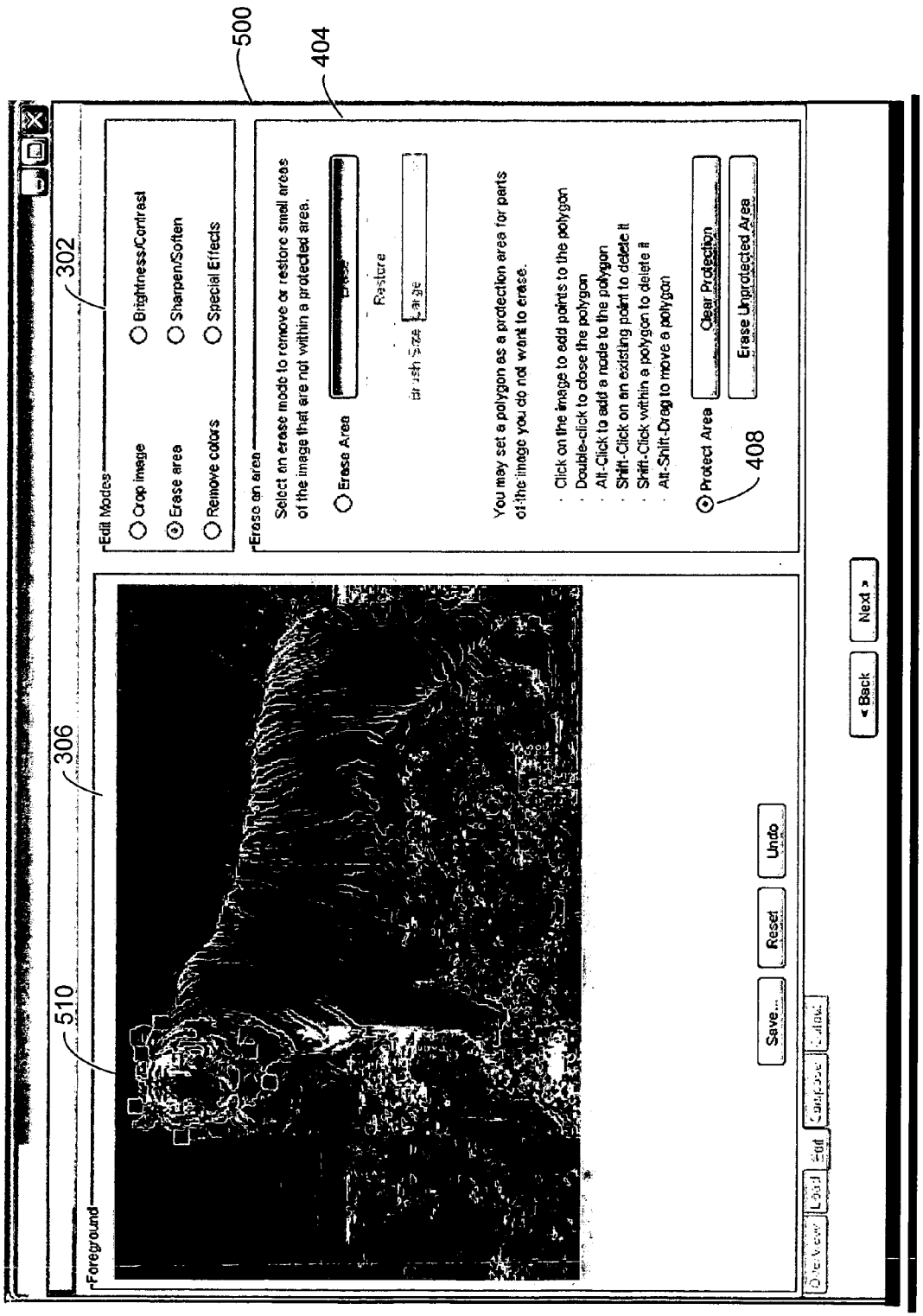
FIG. 5 is another screenshot illustrating an exemplary user interface when protecting an area of the graphical image from alteration.

FIG. 5 is another screenshot illustrating an exemplary user interface when protecting an area of the graphical image from alteration in accordance with the present invention. User interface 500 includes similar fields as user interface field 400, with edit mode field 302, selected edit field 404, and image field 306. However, in user interface 500, protect area selection 408 has been activated allowing a user to select a portion of the image for protection from alteration.

In one embodiment, the area of the image is designated by a polygon (e.g., 510) that is generated by the user on the image. The polygon is generated by selecting points on the image that are interconnected with lines that designate the area to be protected. In the example shown, a portion of the image that corresponds to the tiger's head is designated for protection from alteration. Accordingly, when a user attempts to erase a portion of the image shown in image field 306, the area designated by polygon 510 is protected from the erasing. Additionally, the area protected by the polygon may be the only area of interest to the user. An option is provided in selected edit field 404 that allows a user to simply erase the unprotected area of the image. In the example shown, selecting this option erases the entire image except for the portion within polygon 510. Once any portion of the image is protected as desired by the user and other operations in association with the protected area are completed, the user may move on to other edit modes provided in edit mode field 302 or to other functions provided according to the other user interfaces of the present invention.

Figure 6:
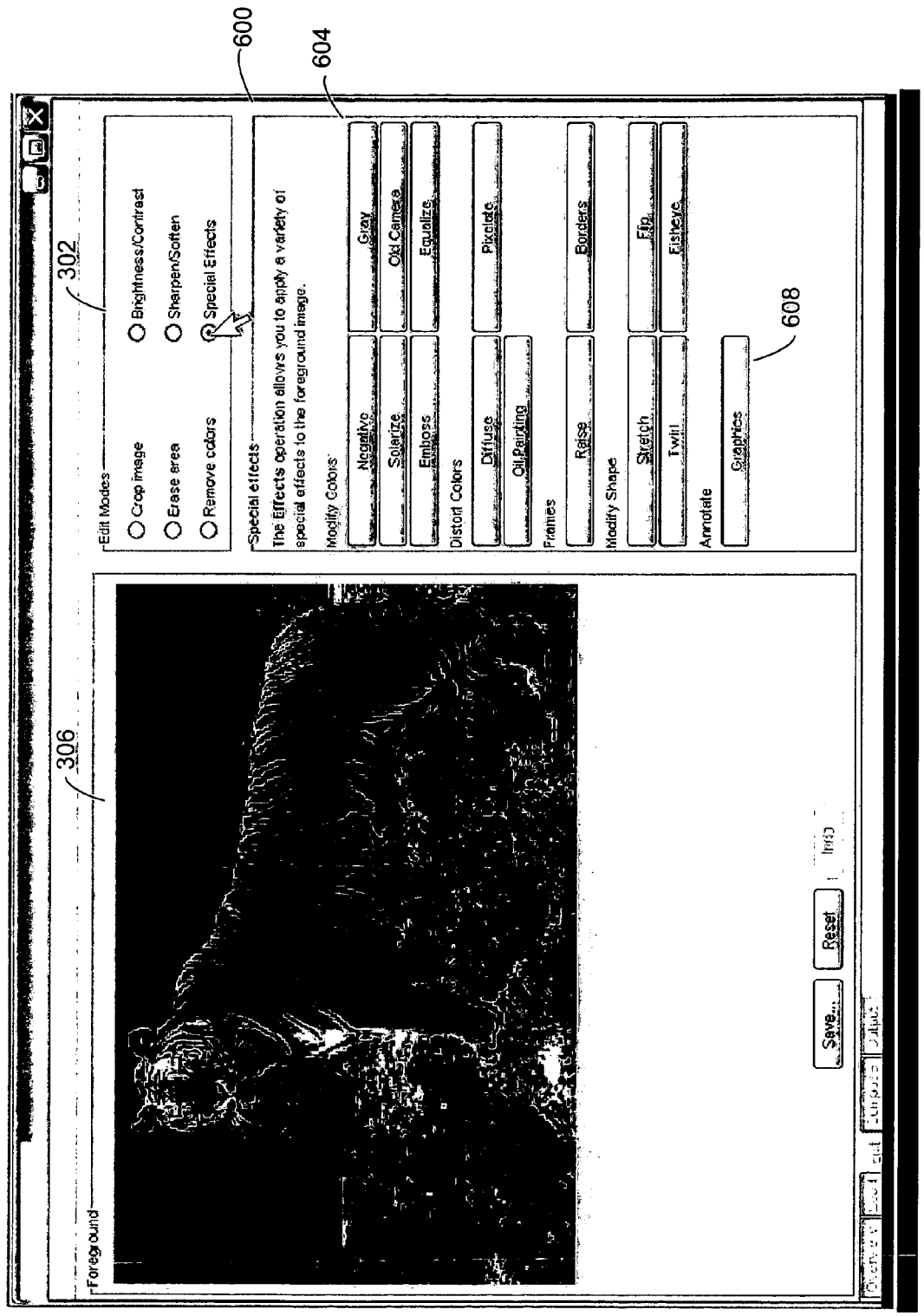
FIG. 6 is another screenshot illustrating an exemplary user interface for editing a foreground image.

FIG. 6 is another screenshot illustrating an exemplary user interface for editing a foreground image in accordance with the present invention. User interface 600 illustrates another edit mode and includes edit mode field 302, selected edit field 604, and image field 306. In edit mode field 302 a "special effects" mode is selected. Since the "special effects" edit mode is selected, selected edit field 604 has been updated to provide instructions and tabs (e.g., 608) for selecting special effects to be applied to the foreground image shown in image field 306.

The present invention provides for a variety of special effects to be applied to the image. The special effects may be organized into categories, such as special effects for modifying colors, distorting colors, adding frames, modifying shapes, and annotations.

The modify color special effects include a variety of special effects such as "negative", "gray", "solarize", "old camera", "emboss", and "equalize". The "negative" special effect creates a negative of the image, where the colors of the image are inverted so that the image mimics a photo negative. The "gray" special effect simply removes all color from the image and converts the image to a grayscale image. The "solarize" special effect is a photographic process simulation for creating the look of a double exposes photographic paper. The "solarize" special effect forces the silver salts to gather around areas that have contrast in the image. The "old camera" special effect simulates an old film/camera image rendering. The "emboss" special effect creates an illusion of impressing an image in relief to achieve a raised surface. The "equalize" special effect modifies an image to ensure that all levels of brightness are equally well represented.

The distort color special effects include a variety of special effects such as "diffuse", "pixelate", and "oil painting". The "diffuse" special effect spreads or scatters the image pixels to create a rippled or distorted look. The "pixelate" special effect merges together smaller pixels into larger pixels. In one embodiment, the size of the pixels is determined by a slider control that pops up when the special effect is selected. The "oil painting" special effect filters the image to create the impression that the image has been painted with oil paints. In one embodiment, the amount of filter applied is determined by a slider control that pops up when the special effect is selected.

The frames special effects include a variety of special effects such as "raise" and "borders". The "raise" special effect allows a user to select the width, color, and range of a created frame in accordance with options presented on a pop up window. The size of the frame may be changed by selecting the width option in the window, the color of the frame may be changed by selecting a color change option, and the range option allows a change of the range or fade of the frame. In one embodiment, selecting the color change option brings up another pop up window with additional color selection options. The "borders" special effect activates a pop up window that gives the user the option to choose between a variety of different textured borders. The different textured borders may include textures such as wood, metallic, flowers, brick, and the like.

The modify shape special effects includes a variety of special effects such as "stretch", "flip", "twirl", and "fisheye". The "stretch" special effect allows a user to click on any portion of the image and essentially stretch the image from that point. The "stretch" special effect allows a user to make caricatures of actual subjects by stretching noses or other features of the image. The "flip" special effect allows the user to flip the image on a horizontal or vertical axis. The "twirl" special effect applies a spin effect to the image that makes the image appear as a whirlpool of the original image. In one embodiment, the amount of spin applied is determined by a selector that pops up when the special effect is selected. The "fisheye" special effect applies a fisheye or bowl lense filter on top of the image, creating the appearance of viewing the image through a fishbowl.

The annotate special effects include a variety of special effects such as a "graphics" special effect. The "graphics" special effect allows the user to draw lines, boxes, curves, and other shapes into the image. The shapes may be a variety of sizes and colors and may be placed anywhere in the image according to the user preference.

Once any of the special effects are applied as desired by the user, the user may move on to other edit modes provided in edit mode field 302 or to other functions provided according to the other user interfaces of the present invention.

Additional user interfaces may be provided in accordance with edit modes other than those shown in the examples herein. For example, another edit mode corresponds to removing colors from the image. Removing colors involves the concept of chroma keying, which is the removal of a color (or small color range) from one image to reveal another image. The removed color becomes transparent. This technique is also referred to as color keying, separation overlay, greenscreen, and/or bluescreen. The removing colors edit mode allows the user to select the color in the image to remove by clicking on the color in the image. A color swatch for that color appears in the selected edit field and a slider may be moved to determine the amount of color similarity to remove. The remove color mode may be used to quickly remove a background color from the image.

Still another edit mode allows the user to change the brightness, contrast, and gamma of an image. The brightness and contrast adjustments may be made similar to other brightness and contrast adjustments provided for other displays and images. The gamma adjustment refers to the brightness of mid-level tones in an image.

Yet another edit mode allows the user to change the sharp/soft level of an image. Softening an image allows the user to achieve a hazy, soft look for the image. In contrast, sharpening an image brings back definition and edges to the image. In one embodiment, the sharpening or softening of an image is determined according to a slider with sharpen and soften on the opposite ends of the spectrum.

Once a user has used any of the above edit modes provided, the user is able to continue on to other tasks including moving to the other user interfaces provided in accordance with the present invention.

Figure 7:
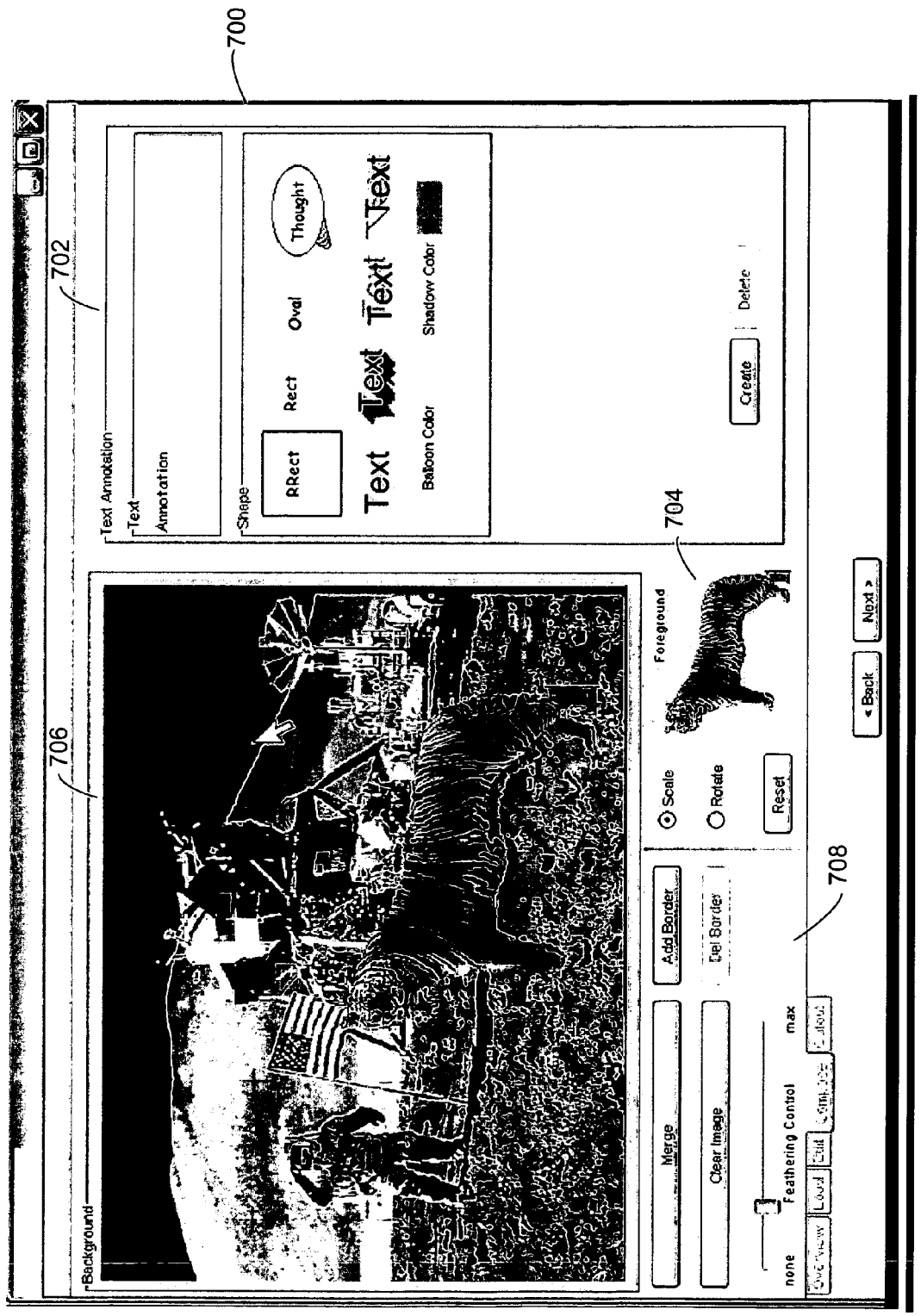
FIG. 7 is a screenshot illustrating an exemplary user interface for merging a foreground image with a background image.

FIG. 7 is a screenshot illustrating an exemplary user interface for merging a foreground image with a background image corresponding to the present invention. User interface 700 includes edit field 702, foreground preview field 704, image field 706, and merge command field 708.

User interface 700 allows the user to view the background image in image field 706 and the foreground image in foreground image preview field 704. Selecting the merge command in merge command field 708 merges the foreground image and background image as shown. A selection of the clear image command in merge command field 708 removes the foreground and allows the user to start again. The feathering control in merge command field 708 allows the user to select the level of edge softening in the foreground image. Once the images are merged, the foreground image may be resized to fit the area desired by the user by selecting the scale feature of foreground preview field 704. Additionally, the foreground image may be rotated as desired by selecting the rotate feature of the same field. Selecting reset at any time returns the foreground image to its original scale and rotation. The foreground image may also be moved within the background image as desired. In one embodiment, the foreground image and the background image are maintained separately in memory until the composite image that includes both images is explicitly output by the user (see FIG. 9). Maintaining the foreground image and the background image as separate files allows the images to be separately edited and manipulated up until the time the composite image is saved.

Once the foreground image and background images are merged, the user may move on to other processes or to other functions provided according to the other user interfaces of the present invention.

Figure 8:
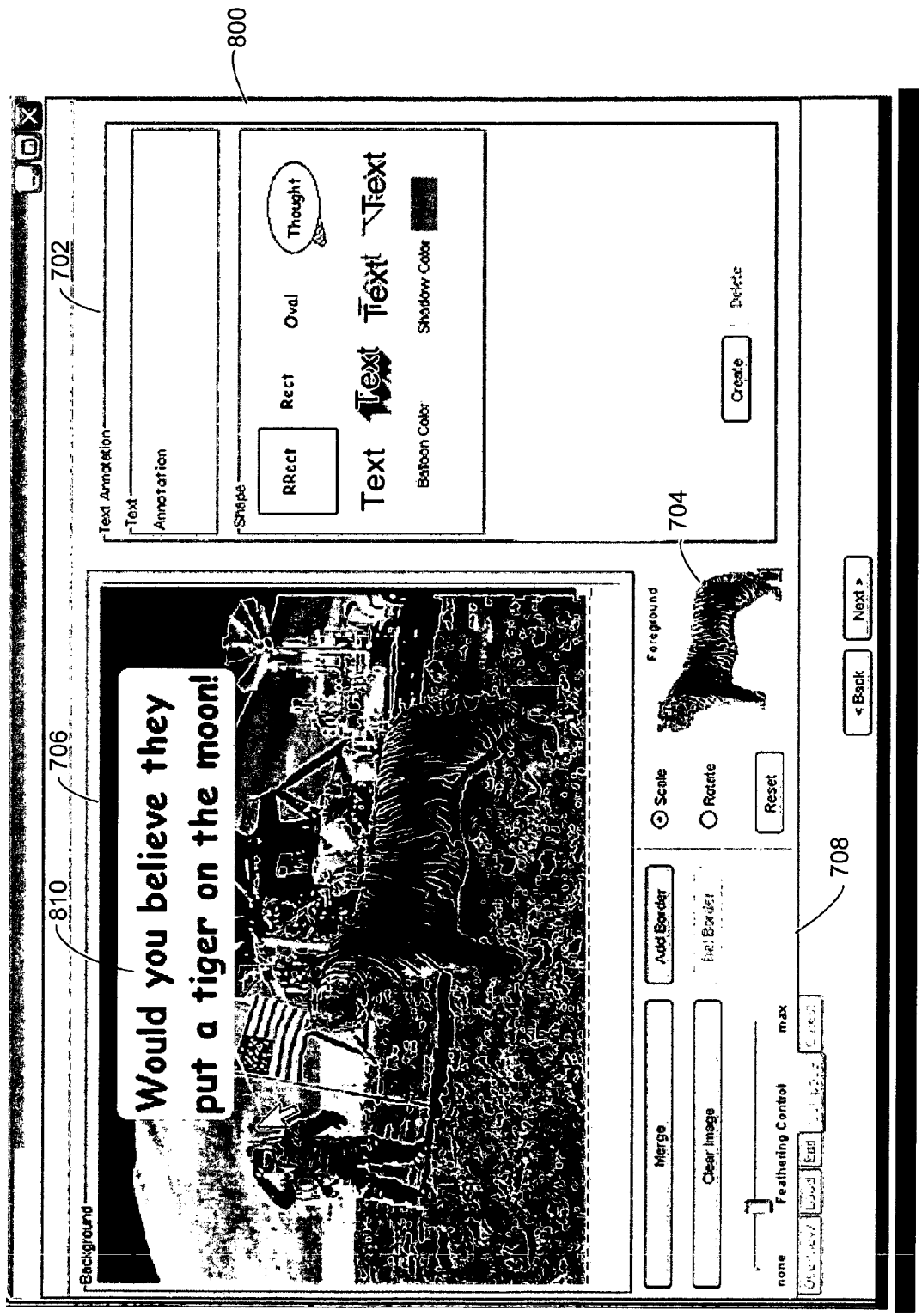
FIG. 8 is a screenshot illustrating an exemplary user interface for editing a merged image.

FIG. 8 is a screenshot illustrating an exemplary user interface for editing a merged image in accordance with the present invention. User interface 800 is similar to user interface 700 shown in FIG. 7. In addition, user interface 800 also includes annotation 810. Annotation represents an edit that may be made to the composite image. Adding an annotation is functionality accessible to the user through edit field 702. The annotation may be place within the composite image in any position desired by the user. When the annotation is a text balloon or conversation bubble, then the position of a tail of the balloon is also selectable. The text of the annotation is typed in the text box included in edit field 702. In another embodiment, the text may be directly typed into the image. Additionally, special affects may be applied to the annotation such as raised lettering, shadows, and the like.

Once a user has edited the composite image, the user is able to continue on to other tasks including moving to the other user interfaces provided in accordance with the present invention.

Figure 9:
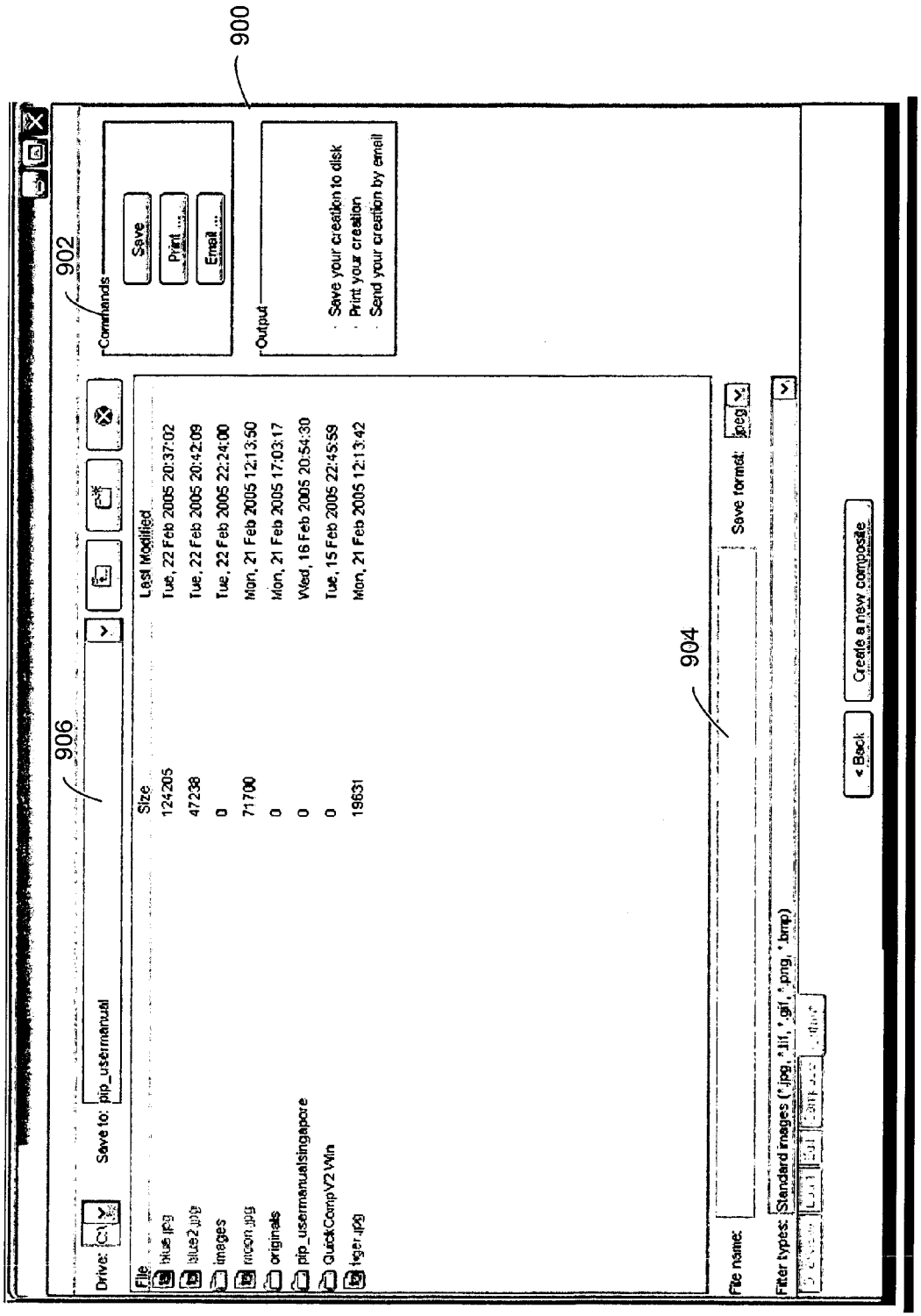
FIG. 9 is a screenshot illustrating an exemplary user interface for outputting the merged and edited image, in accordance with one embodiment of the present invention.

FIG. 9 is a screenshot illustrating an exemplary user interface for outputting the merged and edited image, in accordance with one embodiment of the present invention. User interface 900 includes output selection field 902, filename entry field 904, and file location field 906. Using filename entry field 904 and file location field 906, the user may select a file location and file name for saving the composite image to memory. Using output selection field 902 the user is able to actually select to save the file. Additionally, the user may select to output the composite image to a printer. Known communication protocols may be used to convert and forward the composite image for printing on a printer or other physical output device. In addition, the user may also select to e-mail the composite image directly from user interface 900. If a selection to e-mail the composite image is made, then an e-mail message may be created that already has the image attached that the user is then able to send to destinations of choice. Once a user has outputted the composite image as desired, the user is able to continue on to other tasks including moving to the other user interfaces provided in accordance with the present invention.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for manipulating graphic images, the method comprising:

displaying a graphical window that includes a preview display portion and a designated foreground image preview display portion that comprises a foreground load option and a foreground clear option and a designated background image preview display portion that comprises a background load option and a background clear option, wherein the designated foreground image preview display portion displays a preview of a selected foreground image; wherein the designated background image preview display portion displays a preview of a selected background image; wherein the preview display portion displays a preview of an image that is highlighted within an image listing display within the display window before the image is loaded; wherein the image displayed within the preview display portion is loaded as the foreground image when the foreground load option that is displayed with the foreground image preview display portion is selected and wherein the highlighted image is loaded as the background image when the background load option that is displayed with the background image preview display portion is selected; wherein the foreground image is cleared from the foreground image preview display portion when the foreground clear option is selected and wherein the background image is cleared from the background image preview display portion when the background clear option is selected;

displaying a second graphical window that is configured to edit the foreground image in response to an edit user input; wherein the edit user input is a selection of an edit tab that is displayed within the graphical window;

displaying a third graphical window that is configured to merge the foreground image with the background image in response to a merge user input; wherein the third graphical window includes a foreground preview display portion that is configured to display the foreground image to merge with the background image; and wherein the third graphical window displays the foreground image and the background image merged; wherein the merge user input is a selection of an merge tab that is displayed within the second graphical window.

2. The computer-implemented method of claim 1, wherein the foreground image preview display portion and the background image preview display portion are graphically identified differently.

3. The computer-implemented method of claim 1, wherein the the foreground image is a different file type from the background image.

4. The computer-implemented method of claim 1, wherein editing the foreground image further includes at least one of a group of editing actions including cropping the foreground image, erasing areas of the foreground image, removing colors of the foreground image, brightening the foreground image, altering contrast on the foreground image, altering a gamma measurement of the foreground image, sharpening the foreground image, softening the foreground image, and applying special effects to the foreground image in response to the user input.

5. The computer-implemented method of claim 4, wherein cropping the foreground image removes all but a single rectangular portion of the foreground image from view.

6. The computer-implemented method of claim 4, wherein erasing areas of the foreground image further comprises at least one of using an erasing tool to erase the areas of the foreground image and using a polygon tool to designate an area of the foreground image to be saved such that the remainder of the foreground image is erasable by a user selection.

7. The computer-implemented method of claim 6, further comprising identifying the area of the foreground image designated by the polygon tool as a protected area, such that the designated area is unaffected by other edits made to the foreground image.

8. The computer-implemented method of claim 4, wherein removing colors of the foreground image further comprises chroma keying a selected color out of the foreground image to reveal another color behind the selected color.

9. The computer-implemented method of claim 4, wherein applying special effects further comprises at least one of modifying colors of the foreground image, modifying colors of the foreground image, providing frames for the foreground image, modifying a shape of the foreground image, and annotating the foreground image.

10. The computer-implemented method of claim 4, wherein providing the second graphical window further includes at least one of providing additional displays for each editing action separately and providing additional displays for multiple editing actions.

11. The computer-implemented method of claim 1, wherein the foreground image and the background image are illustrated as merged but are maintained separate in memory.

12. The computer-implemented method of claim 1, wherein editing the merged image further includes adding text to the merged image.

13. The computer-implemented method of claim 12, further comprising applying special effects to the text added to the merged image, wherein the special effects include at least one of surrounding the text with a balloon, altering the text to be three-dimensional, providing a drop shadow to the text, and providing a slant shadow to the text.

14. The computer-implemented method of claim 1, wherein the the merged image is saved in a file type selectable by the user.

15. The computer-implemented method of claim 1, wherein an option is displayed to email the merged image in response to a user selection.

16. A computer-readable storage medium having computer-executable instructions stored thereon for merging a foreground image with a background image, the instructions comprising:
 displaying a window that includes a designated foreground image preview display portion to display a preview of a selected foreground image within a first portion of the window and a designated background image preview display portion to display a preview of a selected background image within a second portion of the window and a preview display portion to display a preview of an image within a third portion of the window that is highlighted within an image listing display configured to display a list of images within a fourth portion of the window; wherein the image displayed within the preview display is loaded as the foreground image when a foreground load option that is displayed within the foreground image preview display portion is selected and wherein the highlighted image is loaded as the background image when a background load option that is displayed within the background image preview display portion is selected;
 editing the foreground image in response to user input, wherein edits to the foreground image are dynamically illustrated to the user;
 merging the foreground image with the background image, wherein the merge of the foreground image and the background image is dynamically illustrated to the user;
 editing the merged image in response to user input, wherein edits to the merged image are dynamically illustrated to the user; and
 saving the merged image to memory in response to user input.

17. The computer-readable storage medium of claim 16, wherein merging the foreground image with the background image further comprises illustrating the foreground image as merged with the background image to the user while maintaining the foreground image separately in memory from the background image until the merged image is saved into memory.

18. The computer-readable storage medium of claim 16, wherein editing the foreground image further comprises providing additional displays for each editing feature selected by the user to be applied to the foreground image.

19. A system for manipulating graphic images, the system comprising:
 a computing device;
 a memory associated with the computing device, the memory including a computer-implemented instructions merging a foreground image with a background image in response to user input, the instructions comprising:
  an image loader for loading a foreground image and a background image into memory in response to a user selection and dynamically illustrating within a graphical window the foreground image and background image selected to the user; wherein the image loader further includes displaying within the graphical window a designated foreground image preview display portion to display a preview of a selected foreground image and a designated background image preview display portion to display a preview of a selected background image and a preview display portion to display a preview of an image that is highlighted within an image listing display that is displayed within the graphical window; wherein the image displayed within the preview display portion is loaded as the foreground image when a foreground load option that is displayed within the foreground image preview display portion is selected and wherein the highlighted image is loaded as the background image when a background load option that is displayed within the background image preview display portion is selected; wherein the foreground image is cleared from the foreground image preview display portion when a foreground clear option that is displayed within the foreground image preview display portion is selected and wherein the background image is cleared from the background image preview display portion when a background clear option that is displayed within the background image preview display portion is selected;
  a foreground image editor for editing the foreground image in response to user input and dynamically illustrating the edits of the foreground image to the user;
  a merging manager for merging the foreground image with the background image and dynamically illustrating the merged image to the user;
  a background image editor for editing the merged image in response to user input and dynamically illustrating the edits of the merged image to the user; and
  an output manager for saving the merged image to memory in response to user input and dynamically illustrating the saved merged image to the user.

20. The system of claim 19, wherein the merging manager is further configured to illustrating the foreground image as merged with the background image to the user while maintaining the foreground image separately in memory from the background image until the merged image is saved into memory by the an output manager.

* * * * *